United States Patent
Lalanne et al.

(10) Patent No.: US 12,302,011 B2
(45) Date of Patent: May 13, 2025

(54) PHOTOSENSITIVE SENSOR AND CORRESPONDING OPTICAL SIGNAL ACQUISITION METHOD

(71) Applicant: STMicroelectronics (Crolles 2) SAS, Crolles (FR)

(72) Inventors: Frederic Lalanne, Bernin (FR); Pierre Malinge, Bernin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 351 days.

(21) Appl. No.: 17/883,764

(22) Filed: Aug. 9, 2022

(65) Prior Publication Data
US 2023/0051181 A1   Feb. 16, 2023

(30) Foreign Application Priority Data
Aug. 12, 2021   (FR) ...................... 2108657

(51) Int. Cl.
H04N 25/77 (2023.01)
G01J 1/44 (2006.01)
H04N 5/33 (2023.01)
H04N 25/42 (2023.01)
H04N 25/75 (2023.01)

(52) U.S. Cl.
CPC ............ *H04N 25/42* (2023.01); *G01J 1/44* (2013.01); *H04N 5/33* (2013.01); *H04N 25/75* (2023.01); *H04N 25/77* (2023.01); *G01J 2001/4473* (2013.01)

(58) Field of Classification Search
CPC ........ H04N 25/42; H04N 25/75; H04N 25/77; H04N 5/33; G01J 1/44; G01J 2001/4473
See application file for complete search history.

(56) References Cited

U.S. PATENT DOCUMENTS

| 2019/0067346 A1 | 2/2019 | Borthakur |
| 2020/0329208 A1 | 10/2020 | Ando et al. |

FOREIGN PATENT DOCUMENTS

WO    WO-2017021328 A1 *  2/2017  ....... H01L 27/14612

OTHER PUBLICATIONS

INPI Search Report and Written Opinion for priority application, FR 2108657, report dated Apr. 21, 2022, 8 pgs.

\* cited by examiner

*Primary Examiner* — Dani Fox
*Assistant Examiner* — Fani Polyzos Boosalis
(74) *Attorney, Agent, or Firm* — Crowe & Dunlevy LLC (57) ABSTRACT

A photosensitive sensor is capable of operating in a global shutter mode and in a rolling shutter mode. The sensor includes at least one pixel with a photosensitive region configured to photogenerate charges. A first transfer gate is configured to transfer photogenerated charges from the photosensitive region to a transfer node. A source-follower transistor is configured to transmit a reading signal to a read node, in the global shutter mode, in a manner controlled by a potential of the photogenerated charges on the transfer node. A second transfer gate is configured to transfer the photogenerated charges from the photosensitive region to the read node in the rolling shutter mode.

20 Claims, 5 Drawing Sheets

PHOTOSENSITIVE SENSOR AND CORRESPONDING OPTICAL SIGNAL ACQUISITION METHOD

PRIORITY CLAIM

This application claims the priority benefit of French Application for Patent No. 2108657, filed on Aug. 12, 2021, the content of which is hereby incorporated by reference in its entirety to the maximum extent allowable by law.

TECHNICAL FIELD

Embodiments and implementations relate to photosensitive sensors for optical signal acquisition.

BACKGROUND

Photosensitive sensors, particularly applied to "machine vision", are capable of detecting visible light, typically with pixels dedicated to the Red, Green and Blue (RGB) components, and pixels dedicated to a Near Infrared (NIR) component.

However, most applications using near infrared, for example active illumination applications, require a "global shutter" integration technique; whereas for most applications in the visible spectrum, a "rolling shutter" integration technique is more effective and versatile. That being said, global shutter mode can also be advantageous for applications in the visible spectrum, particularly in the case of fast-moving object acquisition relative to the integration time.

Global shutter mode is capable of starting and ending the integration of the incident optical signal at the same time for an entire pixel array. When reading, typically a single row can be read at a time, thus the integrated signal is stored in a memory inside each pixel. This memory is generally light-sensitive and can integrate a parasitic signal for the duration of the reading phase, according to a phenomenon usually referred to as "Parasitic Light Sensitivity" (PLS).

Rolling shutter mode, for its part, starts and ends light integration sequentially by row, one row at a time. Thus, the first and the last row of a pixel array will not have exactly the same integration time-point, row integration potentially overlapping or not according to the integration time. For rolling shutter mode, the pixels require no memory and are therefore insensitive to PLS.

The pixels adapted for global shutter mode typically include a memory node, on which the photogenerated signal is stored, pending the reading, and a read node, to which the signal is transferred from the memory node by an amplification stage. Reading is performed via a read line to which the read node signal is transferred by another amplification stage.

The pixels adapted for rolling shutter mode do not typically include the memory node, the photogenerated signal during integration being directly sent to the read node for reading immediately following integration.

Conventionally, fields of application requiring the ability to capture both near infrared images and color images, do not have the advantages of the two global shutter and rolling shutter techniques, and compromises have to be made at the expense of acquisition quality in particular.

Operating a pixel suitable for global shutter mode in rolling shutter mode by direct transmission of the signal from the memory node to the read node, via the amplification stage, introduces a significant additional noise.

Operating a pixel suitable for global shutter mode in rolling shutter mode by short-circuiting the second amplification stage between the read node and the read line poses problems insofar as a high read current must flow to the read line. However, typically, the memory node is accessible via a common command line for a row of pixels, and the command line is not typically capable of supplying enough current to read all the pixels of the row on their respective read lines. Introducing mirror type current sources into the pixels increases the number of transistors per pixel substantially. Accordingly, this technique is not applicable for compact and economical sensors.

Therefore, there is a need for a sensor capable of acquiring signals both with global shutter mode and with rolling shutter mode, without substantially increasing the complexity, size, or cost of the sensor.

SUMMARY

According to an aspect, an embodiment herein proposes a photosensitive sensor capable of operating in a global shutter mode and in a rolling shutter mode, for example on a user's command. The sensor comprises at least one pixel including a photosensitive region configured to photogenerate electric charges, and: a first transfer gate configured to transfer photogenerated charges from the photosensitive region to a transfer node, a source-follower transistor configured to transmit a reading signal to a read node in a manner controlled by the potential of the charges on the transfer node, in global shutter mode; and a second transfer gate configured to transfer photogenerated charges from the photosensitive region to the read node, in rolling shutter mode.

A transfer gate is a selection or switching element, well-known to a person skilled in the art, functionally equivalent to a Metal Oxide Semiconductor" (MOS) transistor, but for which one of the conduction regions is formed by the photosensitive semiconductor region per se. Whereas in a MOS transistor, the conduction region is specific thereto, and usually must be electrically connected to the region of interest by an ohmic coupling.

In other words, the pixel according to this aspect includes two transfer gates directly coupled to the photosensitive regions, one transferring the photogenerated signal to the transfer node and enabling operation in global shutter mode; the other transferring the photogenerated signal to the read node and enabling operation in rolling shutter mode.

According to an embodiment, said at least one pixel further includes a reset transistor coupled with the transfer node and configured to: reset the transfer node charge, before the transfer of the photogenerated charges in global shutter mode; and instruct the source-follower transistor to reset the read node charge, before the transfer of the photogenerated charges in rolling shutter mode.

In other words, the reset transistor is configured not only for the reset of the transfer node, performed conventionally in global shutter mode, but also advantageously to control the source-follower transistor, acting as a reset transistor configured for the reset of the read node in rolling shutter mode.

Indeed, the control lines of the reset and power supply transistor of the source-follower transistor can be accessed selectively to transmit thereto signals for the respective configuration of said transistors in global shutter mode and in rolling shutter mode.

According to an embodiment, said at least one pixel further includes two sampling nodes coupled on the read node and configured to: store a noise reading signal and, respectively, a content reading signal in global shutter mode; and have a high impedance on the read node in rolling shutter mode.

In global shutter mode, this corresponds to the advantageous use of the correlated double sampling reading method, used in particular to subtract a temporal noise component, referred to as kTC noise, from the usable signal. And, in rolling shutter mode, the sampling nodes have a high impedance to the read node, so as not to impact the photogenerated signal transmitted on the read node, for example by blocking switches between the sampling nodes and the read node.

According to an embodiment, said at least one pixel further includes a source-follower output transistor configured to transmit an output signal on a read line in a manner controlled by the potential of the charges to the read node, in global shutter mode and in rolling shutter mode.

According to an embodiment, the source-follower transistor is configured to transmit said reading signal to said read node without being polarized by a current source.

This corresponds, for example, to a seven-transistor pixel, capable of operating in global shutter mode and in rolling shutter mode.

According to an embodiment, the sensor includes a plurality of pixels defined above, arranged in a detection array, including pixels dedicated to visible optical components, and pixels dedicated to an infrared optical components, and a control circuit configured to control an acquisition of an optical signal in global shutter mode or in rolling shutter mode by the pixels dedicated to the visible optical component, and, distinctly, in global shutter mode or in rolling shutter mode by the pixels dedicated to the infrared optical component.

Thus, the sensor can be configured on command in global shutter mode or in rolling shutter mode, for example according to the sensor application and/or the conditions of use of the sensor, and furthermore the type of component detected.

In particular, an advantageous configuration of the sensor will be an acquisition of the visible components of the optical signal in rolling shutter mode, and an acquisition of the infrared component of the optical signal in global shutter mode.

According to a further aspect, an embodiment proposes a method for the acquisition of an optical signal by at least one pixel of a photosensitive sensor, comprising a photogeneration of electric charges by a photosensitive region of the pixel excited by the optical signal, and: in a global shutter mode, a transfer of the photogenerated charges from the photosensitive region to a transfer node via a first transfer gate, a transmission of a reading signal to a read node by a source-follower transistor controlled by the potential of the charges on the transfer node; and in a rolling shutter mode, a transfer of the photogenerated charges from the photosensitive region to the read node via a second transfer gate.

According to an implementation, the method further comprises: in global shutter mode, a reset of the charge of the transfer node, via a reset transistor coupled with the transfer node, before the transfer of the photogenerated charges; and in rolling shutter node, a reset of the charge of the read node via the source-follower transistor controlled by the reset transistor before the transfer of the photogenerated charges.

According to an implementation, the method further comprises: in global shutter mode, a storage of a noise reading signal, and of a content reading signal, in respectively two sampling nodes coupled on the read node; and in rolling shutter mode, an application in the two sampling nodes of a high impedance presented on the read node.

According to an implementation, the method further comprises, in global shutter mode and in rolling shutter mode, a transmission of an output signal on a read line via a source-follower output transistor controlled by the potential of the charges to the read node.

According to an implementation, said transfer of the photogenerated charges from the photosensitive region to the read node is performed without polarizing the source-follower transistor by a current source.

According to an implementation, the method comprises the acquisition of the optical signal by a plurality of said pixels arranged in a detection array of the photosensitive sensor, wherein the acquisition of the optical signal is implemented in global shutter mode or in rolling shutter mode by pixels dedicated to visible optical components, and, distinctly, in global shutter mode or in rolling shutter mode by pixels dedicated to an infrared optical component.

BRIEF DESCRIPTION OF THE DRAWINGS

Further advantages and features of the invention will emerge on studying the detailed description of embodiments and implementations, in no way restrictive, and of the appended drawings wherein.

DETAILED DESCRIPTION

Figure 1:
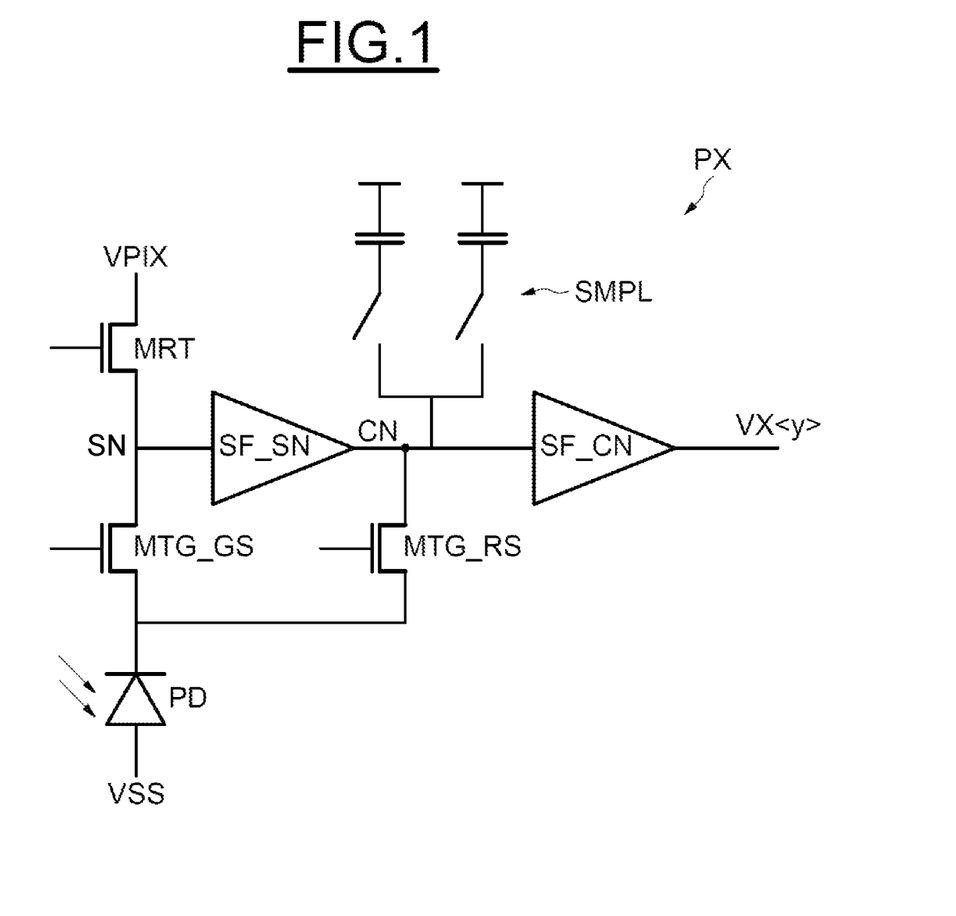
FIG. 1 illustrates a primary circuit of a pixel of a photosensitive sensor that is capable of operating both in a global shutter mode and in a rolling shutter mode.
Figure 2:
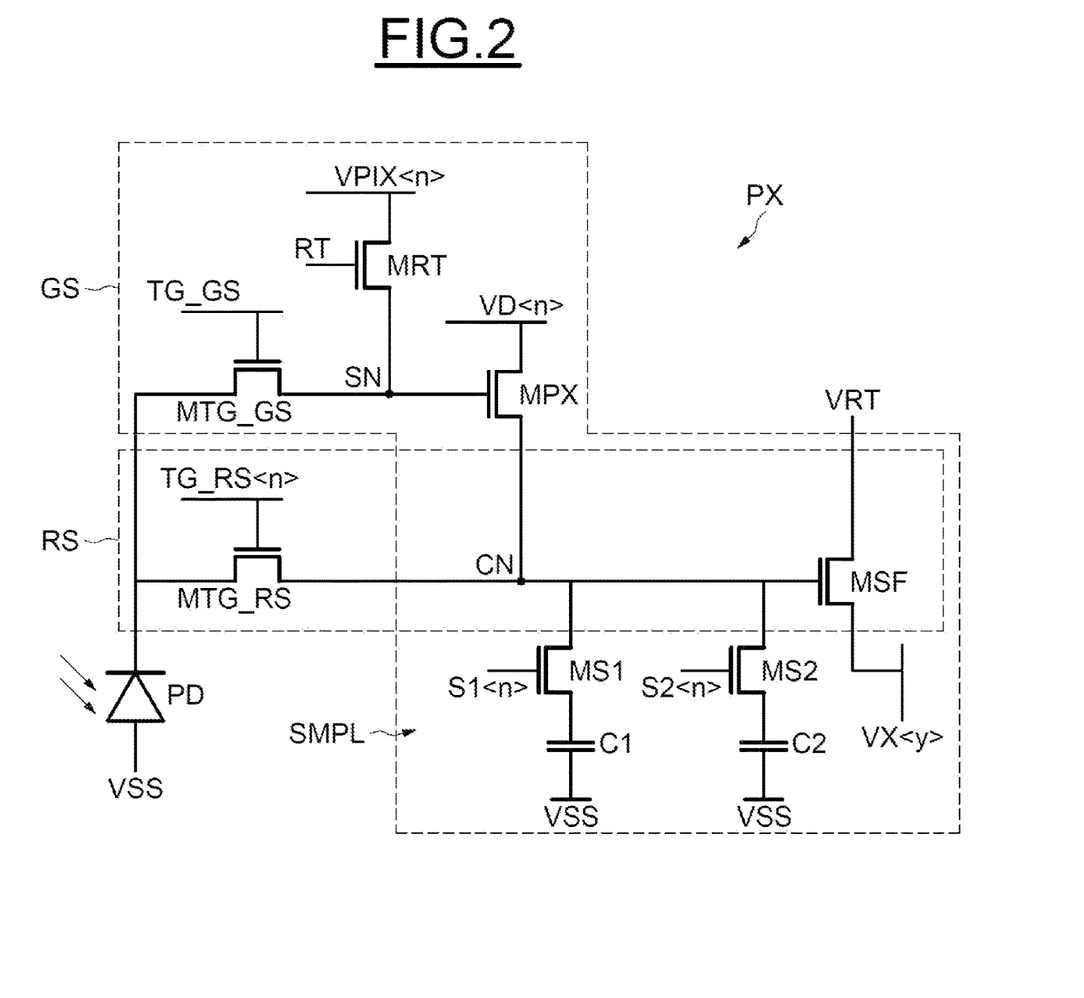
FIG. 2 illustrates in more detail the circuit of an embodiment of the pixel shown in FIG. 1.

FIG. 1 illustrates a primary circuit of a pixel PX of a photosensitive sensor, capable of operating both in a global shutter mode GS (FIG. 2) and in a rolling shutter mode RS (FIG. 2).

The pixel PX comprises a photosensitive region PD, typically a photodiode such as a pinned photodiode, configured to photogenerate electric charges in case of incidence of an optical signal.

The anode of the photodiode PD is, for example, coupled with a low reference potential level VSS, so as to photogenerate negative charges on the cathode thereof.

A first transfer gate MTG_GS is coupled between the photosensitive region PD and a transfer node SN in order to transfer photogenerated charges from the photosensitive region PD to the transfer node SN.

A reset transistor MRT coupled with the transfer node SN is configured to reset the charge of the transfer node SN.

A first amplification stage SF_SN coupled between the transfer node SN and a read node CN, is configured to transmit a reading signal to a read node CN, from the charges present on the transfer node SN.

A sampling circuit SMPL is coupled to the read node, and makes it possible in particular to store signals for implementation of correlated double sampling.

Finally, a second amplification stage SF_CN is coupled between the read node and a read line VX<y>.

Furthermore, a second transfer gate MTG_RS is coupled between the photosensitive region PD and the read node CN in order to directly transfer the photogenerated charges from the photosensitive region PD to the read node CN, without passing through the first amplification stage SF_SN.

The transfer route (channel) of the photogenerated charges going from the photodiode PD to the read line VX<y> via the first transfer gate MTG_GS, the transfer node SN, the first amplification stage SF_SN, the sampling circuit SMPL to the read node CN, and the second amplification stage SF_CN, is dedicated to operation of the pixel in global shutter mode GS (FIG. 2).

The transfer route (channel) of the photogenerated charges going from the photodiode PD to the read line VX<y> via the second transfer gate MTG_RS, the transfer node CN, and the second amplification stage SF_CN, is dedicated to operation of the pixel in rolling shutter mode RS (FIG. 2).

In particular, the second transfer gate MTG_GS is controlled to be blocked in global shutter mode GS, and the first transfer gate MTG_GS is controlled to be blocked in rolling shutter mode RS.

Reference is now made to FIG. 2.

FIG. 2 illustrates in more detail the circuit of an embodiment of the pixel PX described with reference to FIG. 1, wherein the part of the circuit corresponding to global shutter mode GS, and the part of the circuit corresponding to rolling shutter mode RS are outlined.

The first transfer gate MTG_GS, coupled between the photosensitive region PD and the transfer node SN and dedicated to operation in the global shutter mode GS, includes a gate region, equivalent to a MOS transistor, and two conduction regions. One of the conduction regions comprises the photosensitive region PD, or more particularly the cathode of the photodiode PD, the other comprises a doped region configured to collect (or drain) charges, forming the transfer node SN.

A signal TG_GS controls operation of the first transfer gate MTG_GS to transfer photogenerated charges from the photosensitive region PD to the transfer node SN.

For example, the transfer gate control signal TG_GS is a non-decoded signal, i.e., globally applied in all the pixels PX of a detection array ARR (FIG. 4) of the sensor during the integration phase of global shutter mode GS.

A reset transistor MRT is controlled by a reset signal RT so as to bring a reset potential VPIX<n> to the transfer node SN.

The reset signals RT, VPIX<n> are generated at potentials configured to reset the charge of the transfer node SN, before each transfer of the photogenerated charges in global shutter mode GS.

Figure 4:
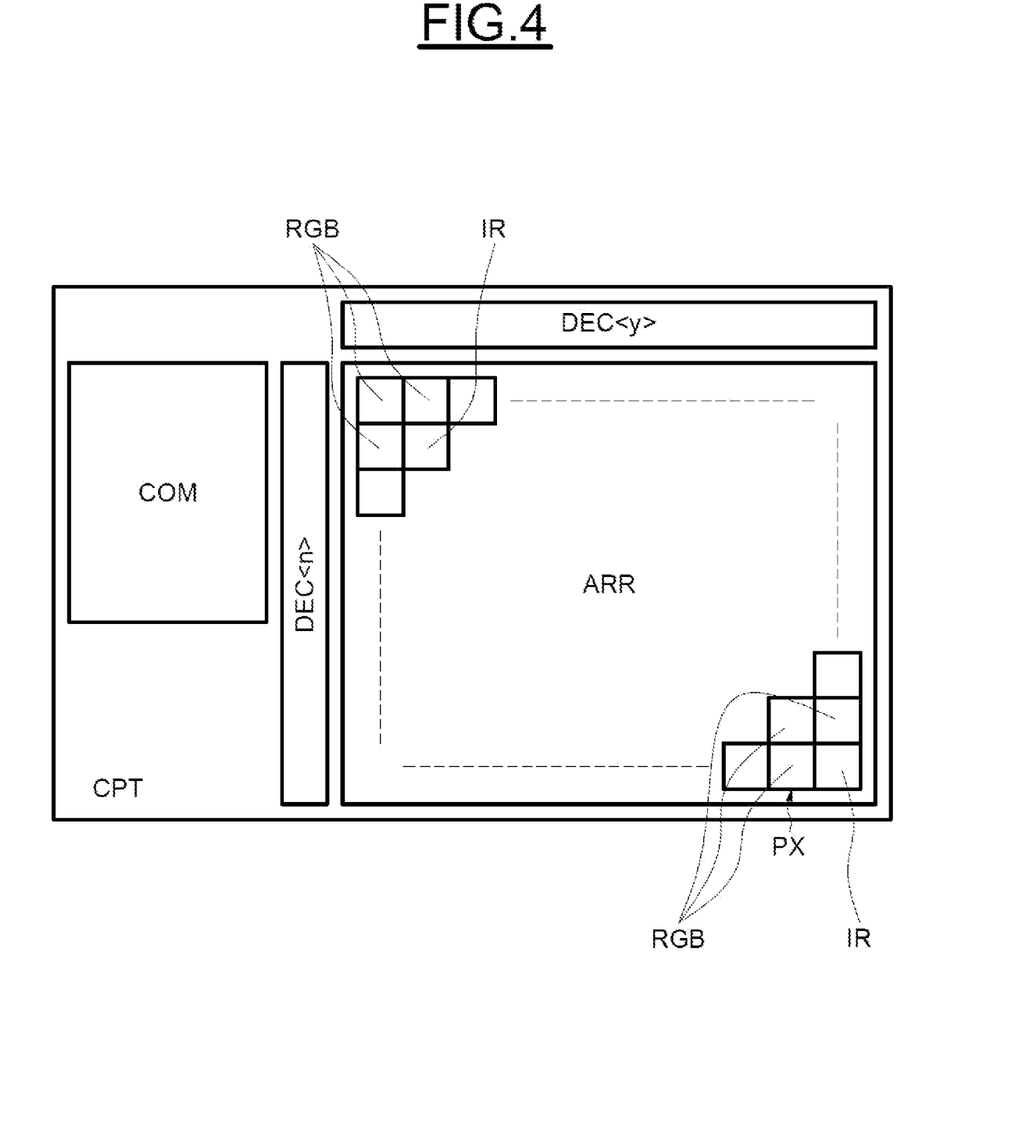
FIG. 4 schematically illustrates a photosensitive sensor capable of operating in a global shutter mode and in a rolling shutter mode by means of pixels as described with reference to FIGS. 1, 2, 3A and 3B.

For example, the reset control signal RT is a non-decoded signal, i.e., globally applied in all the pixels PX of the array ARR (FIG. 4) during the reset phase of global shutter mode GS, whereas the reset potential VPIX<n> is a signal decoded by row, i.e. selectively activated for the pixels PX belonging to the same row of the array ARR (FIG. 4).

The first amplification stage SF_SN (FIG. 1) includes a first source-follower transistor MPX, the gate of which is coupled on the transfer node SN, a conduction region of which is coupled with the read node CN, and the other conduction region of which is coupled with a power supply line VD<n> decoded by row. The decoding by row of the power supply line VD<n> makes it possible to select the row of the pixel PX for the reading on the read line VX<y>, the read line VX<y> being for its part selectively accessible by column.

In particular, the conduction regions of the first source-follower transistor MPX are not polarized by a current source within the pixel PX. This makes it possible advantageously to limit the number of transistors in each pixel PX and thus limit the size of each pixel PX.

Thus, the potential of the charges on the transfer node SN makes it possible to control the transmission of the reading signal to the read node CN, by the first source-follower transistor MPX, in global shutter mode GS.

The pixel PX furthermore includes a sampling circuit SMPL coupled on the read node CN, particularly intended for correlated double sampling reading. The correlated double sampling basically corresponds to a sampling of the temporal noise "kTC" from the reset of the transfer node SN, then a sampling of the usable signal including the temporal noise kTC, in order to permit subtraction of the temporal noise component kTC from the usable signal containing noise.

The sampling circuit SMPL includes in this regard two sampling nodes C1, C2 coupled on the read node CN and configured to store a noise reading signal and, respectively, a content reading signal in global shutter mode GS. The sampling nodes each include a capacitive element C1, C2 to store by capacitive effect said respective reading signals, and a switch MS1, MS2 between the capacitive element C1, C2 and the read node CN, for example a MOS transistor, controlled by a respective switching signal S1<n>, S2<n> decoded by row.

The second amplification stage SF_CN (FIG. 1), includes a second source-follower transistor MSF, also referred to as source-follower output transistor, the gate of which is coupled with the read node CN and the conduction regions of which are coupled with a read power supply line VRT, on one hand, and with the read line VX<y>, on the other.

For example, the read power supply line VRT is not decoded, i.e., common to all the pixels PX of the array ARR (FIG. 4), whereas the read line VX<y> can be decoded by columns, i.e., accessible selectively for the pixels PX belonging to the same column of the array ARR (FIG. 4).

The read power supply line VRT makes it possible particularly to supply a read current that supports readings made on the read lines VX<y> of the sensor, in global shutter mode GS and in rolling shutter mode RS.

In an alternative, an access transistor decoded by row can be coupled in series between the source-follower output transistor MSF and the read line VX<y>. In this case, the power supply line VD<n> of the first source-follower transistor MPX does not need to be decoded by row.

Here again, the potential of the charges on the read node CN makes it possible to instruct the source-follower output transistor MSF to transmit the output signal to the read line VX<y> in global shutter mode GS and also in rolling shutter mode RS.

Thus, the part of the pixel PX corresponding to global shutter mode GS incorporates the first transfer gate MTG_GS, the reset transistor MRT, the first source-follower transistor MPX, the sampling circuit SMPL and the source-follower output transistor MSF.

The part of the pixel corresponding to rolling shutter mode RS incorporates for its part the second transfer gate MTG_RS, and the source-follower output transistor MSF. That being said, as described hereinafter with reference to FIGS. 3A and 3B, the part of the pixel corresponding to rolling shutter mode RS advantageously further incorporates the reset transistor MRT and the first source-follower transistor MPX.

Similarly to the first transfer gate MTG_GS, the second transfer gate MTG_RS coupled between the photosensitive region PD and the read node CN and dedicated to rolling shutter mode RS, includes a gate region, equivalent to a MOS transistor, and two conduction regions. One of the conduction regions comprises the photosensitive region PD, or more particularly the cathode of the photodiode PD, the other comprises a doped region, configured to collect (or drain) charges, forming the read node CN.

A signal TG_RS<n> sequentially controls the second transfer gate MTG_RS to transfer photogenerated charges from the photosensitive region PD to the read node CN.

The sequential transfer gate control signal TG_RS<n> is a signal decoded by row, and is sequentially applied in the pixels PX of the different detection array ARR rows (FIG. 4) of the sensor during the integration phases of rolling shutter mode RS.

After each integration phase of the different rows of pixels PX, the potential of the charges on the read node CN makes it possible to instruct the source-follower output transistor MSF to transmit the output signal to the read line VX<y>, similarly to the read phase in global shutter mode GS.

In rolling shutter mode RS, the switches MS1, MS2 of the sampling circuit SMPL are instructed to be blocked, by the switching control signal S1<n>, S2<n> so as to have a high impedance on the read node CN and thus not generate interference on the photogenerated signal transmitted on the read node CN.

Moreover, the first source-follower transistor MPX and the reset transistor MRT, can advantageously be reoperated in rolling shutter mode RS in order to reset the charge of the read node CN, before the transfers of the photogenerated charges.

Figure 3A:
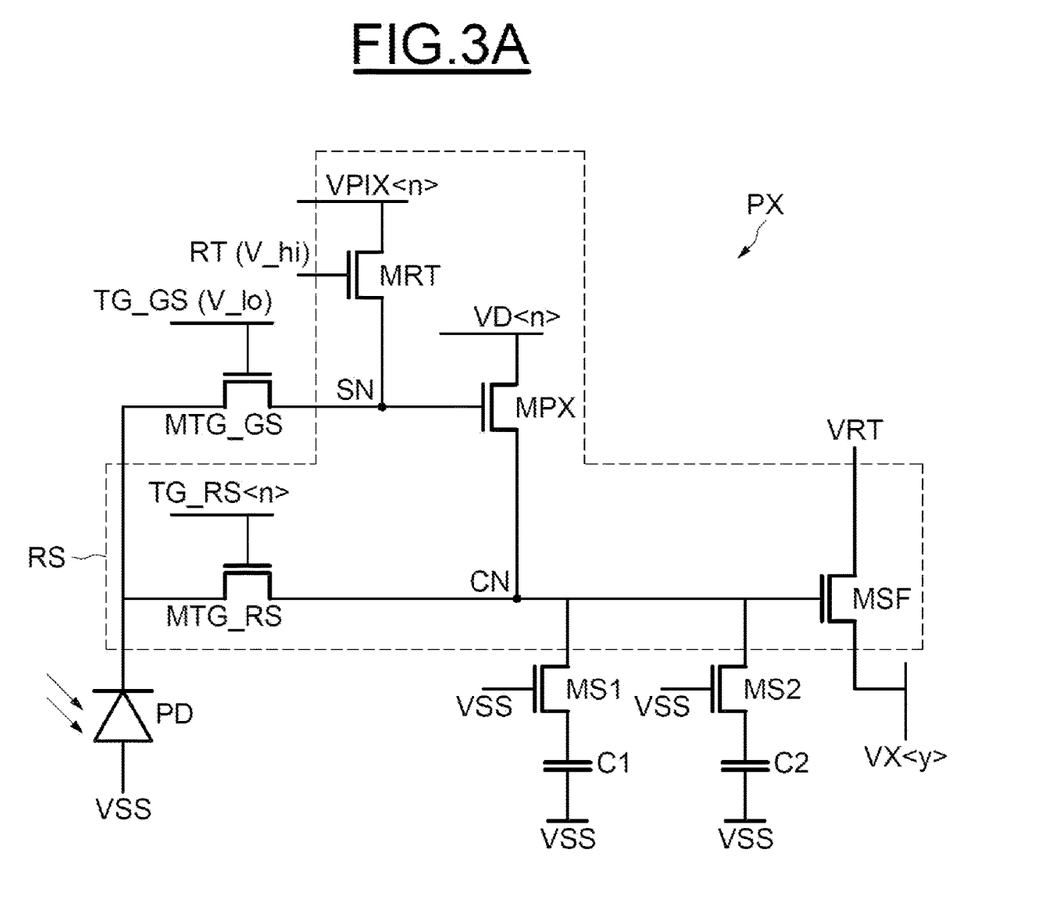
FIG. 3A illustrates the circuit described with reference to FIG. 2, in a status corresponding to a reset phase of the read node for rolling shutter mode.
Figure 3B:
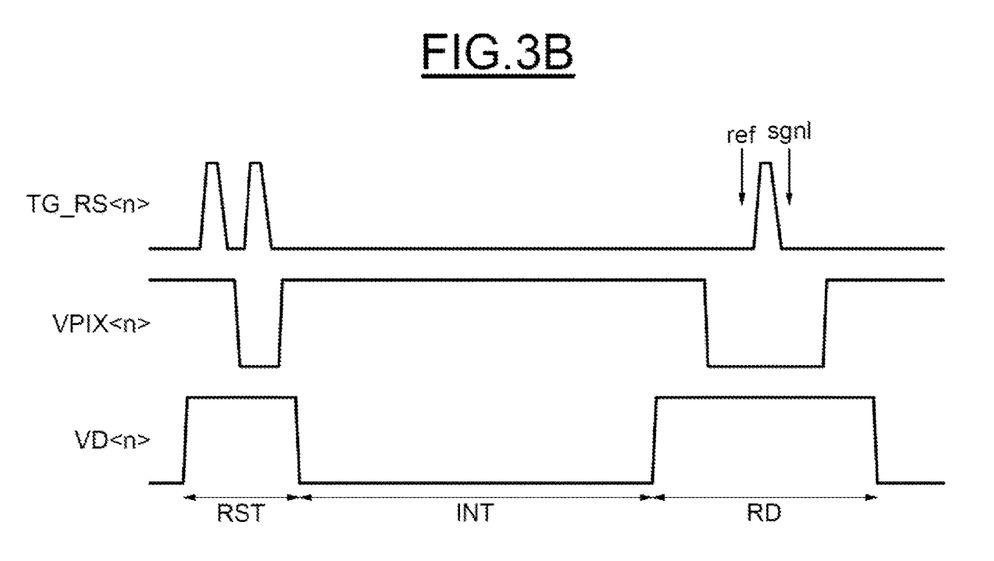
FIG. 3B is a timing diagram for an acquisition cycle in rolling shutter mode.

Reference is made in this regard to FIGS. 3A and 3B.

FIG. 3A illustrates the circuit described with reference to FIG. 2, in a status corresponding to a reset phase of the read node CN for rolling shutter mode RS.

Common elements bear the same references and are not detailed again.

That being said, the signals controlling the elements of the circuit are illustrated for the reset phase of the read node CN, and the frame RS representing the part of the circuit corresponding to rolling shutter mode RS incorporates the reset transistor MRT and the first source-follower transistor MPX.

Thus, during the reset of the read node CN, on one hand, the first transfer gate MTG_GS is blocked by the control TG_GS at a low-level potential V_lo.

Moreover, the reset transistor MRT is instructed to flow via the reset control RT at a high-level potential V_hi, and is powered by the row-decoded reset potential VPIX<n>.

Thus, the reset potential VPIX<n> is communicated on the transfer node SN, and makes it possible to control the first source-follower transistor MPX.

The first source-follower transistor MPX thus makes it possible to transmit to the read node CN the signal present on the row-decoded power supply line VD<n>, in a manner controlled by the reset transistor MRT.

It will be noted that the potential on the row-decoded power supply line VD<n> is brought to a level configured to reset the charge of the read node CN.

It will further be noted that the selectivity by row of the line transmitting the reset potential VPIX<n> and of the power supply line VD<n> of the first source-follower transistor MPX make it possible to implement the reset of the read node CN sequentially and in a manner configured to the sequential integration phases of the rolling shutter mode RS.

FIG. 3B represents a timing diagram of the levels of the signals TG_RG<n>, VPIX<n>, and VD<n> implementing an acquisition cycle in rolling shutter mode RS.

The sequential control signal of the second transfer gate TG_RG<n>, the reset potential signal VPIX<n>, and the signal of the row-decoded power supply line VD<n>, as well as some elements of the circuit PX, such as the first source-follower transistor MPX, will be designated directly by the respective references thereof.

The acquisition cycle comprises a reset phase RST, an integration phase INTG, and a read phase RD.

In the reset phase RST, a first pulse of the control signal of the transfer gate TG_RS<n> is made during high levels of the signal VPIX<n> and of the signal VD<n>, so as to "firmly" reset the photosensitive region PD by the high level of the signal VD<n> directly polarizing the read node CN. The second pulse of the signal TG_RS<n> is made during a low level of the signal VPIX<n> blocking the transistor MPX and thus placing the read node CN at a floating potential, which makes it possible to balance the charges and particularly avoid transfer noises.

In the integration phase INTG, the signal VPIX<n> is at a high level, instructing the transistor MPX to flow, in order to transmit the signal VD<n> to the read node CN. The signal VD<n> is at a low level, in order to block the source-follower output transistor MSF, to enable the reading of the other rows of pixels on the same read line VX<y>.

In the read phase RD, the level of the signal VD<n> is raised to the high level, for enough time before lowering the level of the signal VPIX to the low level, to polarize the read node CN at a high-level floating potential. A first reading "ref" can measure a reference signal on the read line VX<y>, then a second reading "sgnl", after a pulse on the control signal of the transfer gate TG_RS<n>, measures the photogenerated signal during the integration phase INTG.

FIG. 4 schematically illustrates a photosensitive sensor CPT capable of operating in a global shutter mode GS and in a rolling shutter mode RS by means of pixels PX as described with reference to FIGS. 1, 2, 3A and 3B.

The photosensitive sensor CPT includes a plurality of this pixel PX, arranged in a detection array ARR. The arrangement of the pixels PX in the detection array ARR is typically carried out by selectable rows by a row decoder DEC<n>, and by selectable columns by a column decoder DEC<y>.

In particular, the row decoder DEC<n> is configured to distribute the signals TG_RS<n>, VPIX<n> and VD<n> in the selected row "n"; and the column decoder DEC<y> is configured to access the read line VX<y> of the selected column "y".

The array ARR includes pixels dedicated to visible optical components RGB, and pixels dedicated to an infrared optical component IR, typically by means of optical filters placed in front of the respective pixels PX.

Moreover, the sensor includes a control circuit COM configured to control an acquisition of an optical signal in global shutter mode GS or in rolling shutter mode RS, particularly via row DEC<n> and column decoders DEC<y>. The row DEC<n> and column decoders DEC<y> can be considered to belong to the control circuit COM.

Furthermore, the control circuit COM can control the acquisition of the incident optical signal by the pixels of the visible RGB and infrared IR components distinctly in global shutter mode GS or in rolling shutter mode RS.

In particular, an advantageous configuration of the control circuit COM of the sensor CPT will execute an acquisition of the optical signal in rolling shutter mode RS with pixels dedicated to the pixels dedicated to the visible components RGB, and an acquisition of the optical signal in global shutter mode GS with the pixels dedicated to the infrared component IR.

The invention claimed is:

1. A photosensitive sensor, comprising:
   at least one pixel capable of operating in a global shutter mode and in a rolling shutter mode, said at least one pixel including:
   a photosensitive region configured to photogenerate electric charges;
   a first transfer gate configured to transfer said photogenerated electric charges from the photosensitive region to a transfer node;
   a first source-follower transistor configured to transmit a reading signal to a read node when the at least one pixel is operating in the global shutter mode in response to a potential of the photogenerated electric charges on the transfer node;
   a second transfer gate configured to transfer said photogenerated electric charges from the photosensitive region to the read node when the at least one pixel is operating in the rolling shutter mode; and
   a second source-follower transistor configured to transmit an output signal on a read line in response to a potential on the read node when the at least one pixel is operating in both the global shutter mode and the rolling shutter mode.

2. The photosensitive sensor according to claim 1, wherein said at least one pixel further includes:
   a reset transistor coupled to the transfer node and configured to:
   when the at least one pixel is operating in the global shutter mode, reset the transfer node charge before the transfer of the photogenerated electric charges; and
   when the at least one pixel is operating in the rolling shutter mode, control the source-follower transistor to reset charge on the read node before the transfer of the photogenerated electric charges.

3. The photosensitive sensor according to claim 1, wherein said at least one pixel further includes:
   two sampling nodes coupled to the read node and configured to:
   when the at least one pixel is operating in the global shutter mode, respectively store a noise reading signal and a content reading signal; and
   when the at least one pixel is operating in rolling shutter mode, have a high impedance on the read node.

4. The photosensitive sensor according to claim 1, wherein the first source-follower transistor is configured to transmit said reading signal to said read node without being polarized by a current source.

5. The photosensitive sensor according to claim 1, wherein said at least one pixel comprises a plurality of pixels arranged in a detection array.

6. The photosensitive sensor according to claim 5, wherein said plurality of pixels comprises pixels dedicated to visible optical components and pixels dedicated to an infrared optical component.

7. The photosensitive sensor according to claim 6, further comprising a control circuit configured to control an acquisition of an optical signal when operating in the global shutter mode or in the rolling shutter mode by the pixels dedicated to the visible optical components.

8. The photosensitive sensor according to claim 7, wherein said control circuit is further configured to control an acquisition of an optical signal when operating in the global shutter mode or in the rolling shutter mode by the pixels dedicated to the infrared optical component.

9. A method for acquisition of an optical signal by at least one pixel of a photosensitive sensor capable of operating in a global shutter mode and in a rolling shutter mode, comprising:
   photogeneration of electric charges by a photosensitive region of the pixel excited by the optical signal;
   when the at least one pixel is operating in the global shutter mode, transfer of the photogenerated electric charges from the photosensitive region to a transfer node via a first transfer gate and transmission of a reading signal to a read node by a first source-follower transistor controlled by a potential of the photogenerated electric charges on the transfer node;
   when the at least one pixel is operating in the rolling shutter mode, transfer of the photogenerated electric charges from the photosensitive region to the read node via a second transfer gate; and
   when the at least one pixel is operating in both the global shutter mode and the rolling shutter mode, transmitting an output signal to a read line via a source-follower output transistor controlled by a potential of charges at the read node.

10. The method according to claim 9, further comprising:
    when the at least one pixel is operating in the global shutter mode, before the transfer of the photogenerated electric charges, resetting a charge of the transfer node via a reset transistor coupled to the transfer node, before the transfer of the photogenerated electric charges; and
    when the at least one pixel is operating in the rolling shutter node, before the transfer of the photogenerated electric charges, resetting a charge of the read node via the source-follower transistor controlled by the reset transistor.

11. The method according to claim 9, further comprising:
    when the at least one pixel is operating in the global shutter mode, storing a noise reading signal and a content reading signal, respectively, in two sampling nodes coupled on the read node; and
    when the at least one pixel is operating in the rolling shutter mode, applying in the two sampling nodes a high impedance presented on the read node.

12. The method according to claim 9, wherein transferring photogenerated electric charges from the photosensitive region to the read node is performed without polarizing the source-follower transistor by a current.

13. The method according to claim 9, wherein said at least one pixel is arranged in a detection array of the photosensitive sensor.

14. The method according to claim 13, wherein acquisition of the optical signal is implemented when operating in the global shutter mode or the rolling shutter mode by pixels of the detection array dedicated to visible optical components.

15. The method according to claim 14, wherein acquisition of the optical signal is implemented when operating in the global shutter mode or the rolling shutter mode by pixels of the detection array dedicated to an infrared optical component.

16. A photosensitive sensor, comprising:

at least one pixel capable of operating in a global shutter mode and in a rolling shutter mode, said at least one pixel including:

a photosensitive region configured to photogenerate electric charges;

a global shutter transfer transistor configured to transfer said photogenerated electric charges from the photosensitive region to a transfer node in response to a global shutter control signal;

a rolling shutter transfer transistor configured to transfer said photogenerated electric charges from the photosensitive region to a read node in response to a rolling shutter control signal; and a first source-follower transistor having a gate connected to the transfer node, a first conduction region connected to receive a row decoded power supply signal and a second conduction region connected to the read node.

17. The photosensitive sensor of claim 16, wherein said at least one pixel further comprises a second source-follower transistor having a gate connected to the read node, a first conduction region connected to a power supply node and a second conduction region connected to a pixel output node.

18. The photosensitive sensor of claim 16, wherein said at least one pixel further comprises a reset transistor coupled to the transfer node.

19. The photosensitive sensor of claim 16, wherein said at least one pixel further includes two sampling nodes coupled to the read node.

20. The photosensitive sensor of claim 16, wherein the first source-follower transistor is not polarized by a current source.

* * * * *